United States Patent
Wang

(10) Patent No.: US 8,223,606 B2
(45) Date of Patent: Jul. 17, 2012

(54) DEVICE AND METHOD FOR DETECTING DISC DEFECT

(75) Inventor: Sih-Kai Wang, Tainan (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 781 days.

(21) Appl. No.: 12/270,361

(22) Filed: Nov. 13, 2008

(65) Prior Publication Data
US 2009/0135694 A1 May 28, 2009

(30) Foreign Application Priority Data
Nov. 23, 2007 (TW) .............................. 96144593 A

(51) Int. Cl.
*G11B 7/00* (2006.01)

(52) U.S. Cl. .............. 369/53.15; 369/53.42; 369/124.01

(58) Field of Classification Search .............. 369/53.42, 369/53.12–53.17, 124.01
See application file for complete search history.

(56) References Cited

U.S. PATENT DOCUMENTS

| 5,377,054 | A * | 12/1994 | Yamaguchi et al. | 360/39 |
| 5,841,751 | A * | 11/1998 | Komazaki et al. | 369/53.33 |
| 5,854,781 | A * | 12/1998 | Kurihara | 369/53.29 |
| 6,366,549 | B1 * | 4/2002 | Lee et al. | 369/112.05 |
| 6,735,162 | B2 * | 5/2004 | Armitage et al. | 369/124.11 |
| 6,882,611 | B2 * | 4/2005 | Chen | 369/53.15 |
| 7,016,280 | B2 * | 3/2006 | Kadlec | 369/53.16 |
| 2004/0145987 | A1 * | 7/2004 | Ryu et al. | 369/53.15 |
| 2007/0280060 | A1 * | 12/2007 | Tsai et al. | 369/44.26 |

* cited by examiner

*Primary Examiner* — Thomas Alunkal
(74) *Attorney, Agent, or Firm* — WPAT., P.C.; Justin King

(57) ABSTRACT

A method for detecting a typical defect area on a disc track includes the following steps. Firstly, a source signal is provided. Then, first and second signals are generated according to the source signal. The first and second signals are held at the peak level of the source signal and respectively decreased at first and second drop rates. Then, first and second threshold values are subtracted from the first and second signals to generate first and second slice signals, respectively. Afterwards, the source signal is compared with either the first slice signal or the second slice signal. When the first slice signal is larger than the source signal, a typical defect signal is changed from a first level to a second level. Whereas, the typical defect signal is changed from the second level to the first level when the second slice signal is smaller than the source signal.

10 Claims, 8 Drawing Sheets

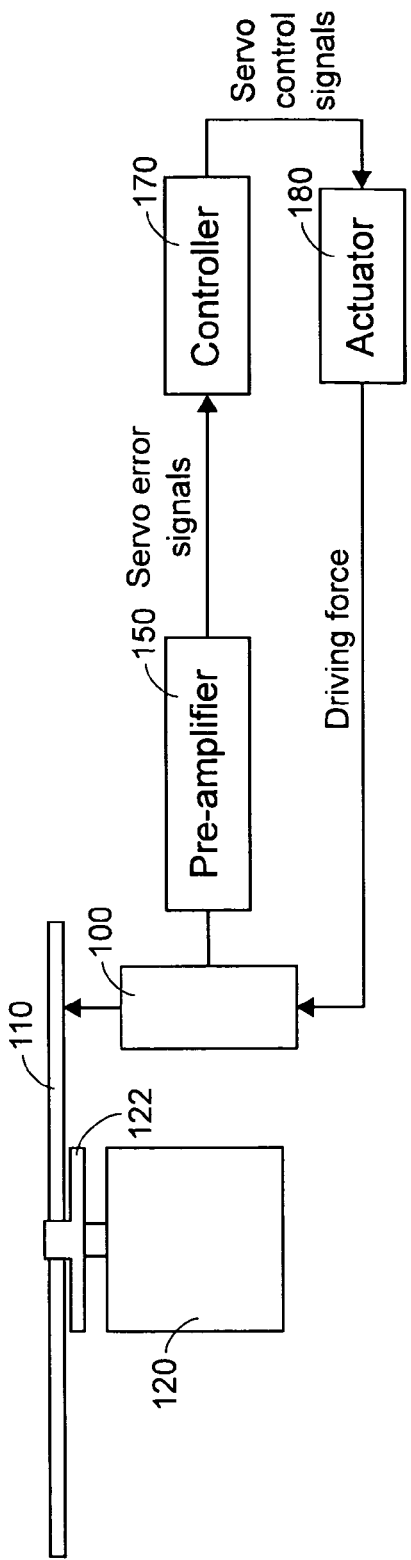
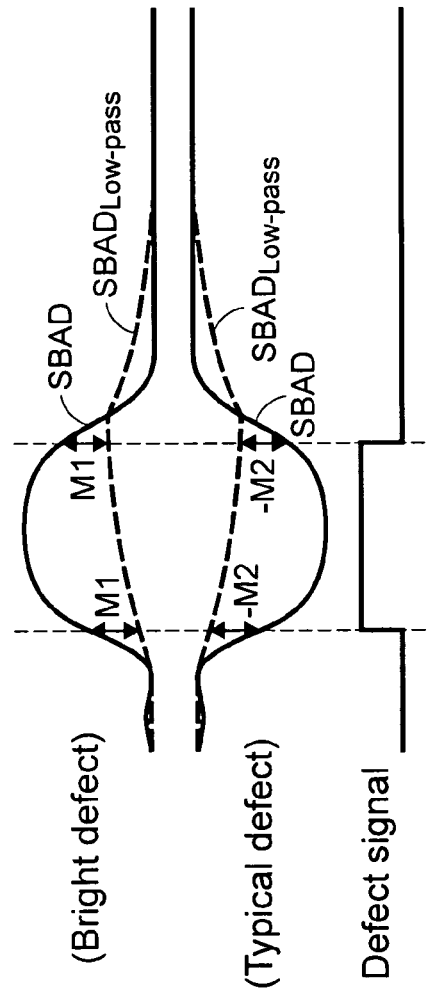
FIG.1 (PRIOR ART)
FIG.2 (PRIOR ART)

DEVICE AND METHOD FOR DETECTING DISC DEFECT

FIELD OF THE INVENTION

The present invention relates to a device and a method for detecting a defect on a disc track, and more particularly to a defect-detecting device and a defect-detecting method for used in an optical disc drive.

BACKGROUND OF THE INVENTION

Referring to FIG. 1, a conventional servo control system of an optical disc drive is shown. An optical disc 110 having a center hole is placed on a turn table 122. The turn table 122 is driven to rotate by a spindle motor 120 such that the optical disc 110 is rotated with the turn table 122. An actuator 180 outputs a driving force for an optical pickup head (PUH) 100 of the optical disc drive in a tracking (radial) direction or a focusing direction.

When an electronic signal is generated in response to the optical signal reflected from the optical disc 110 and received by the optical pickup head 100, a pre-amplifier 150 process the electronic signal into a series of servo error signals. The servo error signals include for example a radio-frequency signal RF, a sub-beam added signal (SBAD), a wobble signal, a focusing error signal FE, a tracking error signal TE and the like.

According to these servo error signals, the controller 170 generates a series of servo control signals to the actuator 180. Generally, the servo control signals include a tracking control signal and a focusing control signal. In addition, the actuator 180 includes at least a tracking coil and a focusing coil. According to the tracking control signal, the tracking coil generates a radial driving force for actuating a trace shift of the optical pickup head 100 in the tracking direction. According to the focusing control signal, the focusing coil generates a focusing-direction driving force for actuating a shift of the optical pickup head 100 in the focusing direction. Under the control of the radial driving force and the focusing-direction driving force, the optical pickup head 100 is located at the proper focusing position and onto the desired track.

As known, due to production failure or scratch, some defects are readily formed on the surface of the optical disc 110. Since data within the defective area of the optical disc 110 can not be read by the optical pickup head 100, the servo error signals outputted from the pre-amplifier 150 would become beyond expectation. The fluctuation of the servo error signals would further result in the unexpected servo control signals by the controller 170 and thus the actuator 180 may generate improper driving forces. Under this circumstance, the servo control system of the optical disc drive is unstable, which may cause the optical pickup head 100 to have focusing fail or slip track. Eventually, these defects could result in reading or writing errors.

FIG. 2 is a timing waveform diagram illustrating a relationship between a sub-beam added signal, a low-pass signal a defect signal. In the drawings, the term SBAD indicates a sub-beam added signal. The sub-beam added signal SBAD is filtered by a low-pass filter (not shown) to generate a low-pass signal ($SBAD_{Low-pass}$). Please refer to FIGS. 1 and 2. In a case that the optical pickup head 100 is moved along a track having a bright defect area with strong reflection, the sub-beam added signal SBAD rises up at a faster rate but the low-pass signal $SBAD_{Low-pass}$ rises up at a slower rate. If the difference between the sub-beam added signal SBAD and the low-pass signal $SBAD_{Low-pass}$ is larger than a first threshold value (M1), the defect signal (DETECT) outputted from the controller 170 is changed from a first level (e.g. a low level) to a second level (e.g. a high level). Until the difference between the sub-beam added signal SBAD and the low-pass signal $SBAD_{Low-pass}$ is smaller than the first threshold value (M1), the defect signal returns to the first level. On the contrary, in a case that the optical pickup head 100 is moved along a track having a typical defect area (e.g. a scratch), the sub-beam added signal SBAD drops down at a faster rate but the low-pass signal $SBAD_{Low-pass}$ drops down at a slower rate. If the difference between the sub-beam added signal SBAD and the low-pass signal $SBAD_{Low-pass}$ is smaller than a second threshold value (−M2), the defect signal (DETECT) outputted from the controller 170 is changed from the first level to the second level. Until the difference between the sub-beam added signal SBAD and the low-pass signal $SBAD_{Low-pass}$ is larger than the second threshold value (−M2), the defect signal returns to the first level. According to the defect signal (DETECT), the driving force generated from the actuator 180 is adjusted in order to protect the optical disc drive from being subject to focusing fail or slip track.

FIG. 3 schematically illustrates a defect-detecting circuit disclosed in description of U.S. Pat. No. 6,882,611. As shown in FIG. 3, the defect-detecting circuit includes a low-pass filter 24, a subtractor 28, two comparators 22a and 22b, and an OR gate 26. A negative input end of the comparator 22a is coupled to a preset positive threshold (DFTH_P), which represents the first threshold value for detecting the bright defect. A positive end of the comparator 22b is coupled to a preset negative threshold (DFTH_N), which represents the second threshold value for detecting the typical defect.

The sub-beam added signal SBAD is filtered by the low-pass filter 24 to generate a low-pass signal (SBAD_LPF). The subtractor 28 subtracts the SBAD_LPF from the original SBAD and transmits the result to the two comparators 22a and 22b. If the result is larger than the first threshold value, the area is determined as a bright defect area. Whereas, if the result is smaller than the second threshold value, the area is determined as a typical defect area.

FIG. 4 is a timing waveform diagram illustrating related signals processed in the defect-detecting circuit of FIG. 3, in which a relatively long defect is present. In a case that the optical pickup head is moved along a track having a relatively long defect area (one kind of typical defect area), the sub-beam added signal SBAD drops down at a faster rate but the low-pass signal SBAD_LPF drops down at a slower rate. At the time spot T1, since the difference between the sub-beam added signal SBAD and the low-pass signal SBAD_LPF is smaller than the second threshold value (DFTH_N), the defect signal (DETECT) is changed from the low level to the high level. Meanwhile, the detected area is determined as a typical defect area.

However, the above defect-detecting circuit usually generates inaccurate defect signals during the optical pickup head moves along the track having the long defect area. As the low-pass signal SBAD_LPF continuously drops down, the difference between the sub-beam added signal SBAD and the low-pass signal SBAD_LPF becomes larger than the second threshold value (DFTH_N) at the time spot T2. Meanwhile, the defect signal (DETECT) is changed from the high level to the low level and thus the defect signal (DETECT) is erroneously ended at the time spot T2. Under this circumstance, the defect-detecting circuit discriminates that no defect area is present.

At the time spot T3, since the difference between the sub-beam added signal SBAD and the low-pass signal SBAD_LPF is larger than the first threshold value (DFTH_P), the defect signal (DETECT) is changed from the low level to the high level. Meanwhile, the detected area is determined as a typical defect area. Until the difference between the sub-beam added signal SBAD and the low-pass signal SBAD_LPF is smaller than the first threshold value (DFTH_P) at the time spot T4, the defect signal (DETECT) is changed from the high level to the low level. In other words, an erroneous defect signal is generated from the time point T3 to T4.

As previously described, an erroneous defect signal is generated if a long defect is present. In a case that a long typical defect area is present (as shown in FIG. 4), two pulses sequentially including a typical defect area and a bright defect area occur. Moreover, in a case that a long bright defect is present, two pulses sequentially including a bright defect area and a typical defect area occur.

For avoiding generation of the erroneous defect signal, U.S. Pat. No. 6,882,611 disclosed a defect-detecting circuit and a defect-detecting method, and the contents thereof are hereby incorporated by reference. As shown in FIG. 5, the defect-detecting circuit includes a switch S1, a capacitor 30, a low-pass filter 24, a subtractor 28, an OR gate 26 and two comparators 22a and 22b. A negative input end of the comparator 22a is coupled to a preset positive threshold (DFTH_P), which indicates the first threshold value for detecting the bright defect. A positive end of the comparator 22b is coupled to a preset negative threshold (DFTH_N), which indicates the second threshold value for detecting the typical defect. The sub-beam added signal SBAD is filtered by the low-pass filter 24 to generate a low-pass signal (SBAD_LPF). The subtractor 28 subtracts the SBAD_LPF from the original SBAD and couples to the two comparators 22a and 22b. The switch S1 controls whether the SBAD is sent to the low-pass filter 24 and is controlled by the defect signal.

FIG. 6 is a timing waveform diagram illustrating related signals processed in the defect-detecting circuit of FIG. 5, in which a relatively long defect is present. In a case that the optical pickup head is moved along a track having a relatively long defect (one kind of typical defect), the sub-beam added signal SBAD drops down at a faster rate but the low-pass signal SBAD_LPF drops down at a slower rate. At the time spot T5, since the difference between the sub-beam added signal SBAD and the low-pass signal SBAD_LPF is smaller than the second threshold value (DFTH_N), the defect signal (DETECT) is changed from the low level to the high level and the detected area is determined as a typical defect area. Once the defect signal (DETECT) is changed from the low level to the high level, the switch S1 is opened such that the SBAD signal can no longer flow through the low-pass filter 24 and the value of the low-pass signal (SBAD_LPF) is held by the capacitor 30.

Until the difference between the sub-beam added signal SBAD and the low-pass signal SBAD_LPF is greater than the second threshold value (DFTH_N) at the time spot T6, the defect signal (DETECT) is changed from the high level to the low level. Meanwhile, the switch S1 is closed and the SBAD signal can flow through the low-pass filter 24.

In accordance with the defect-detecting circuit and the defect-detecting method shown in FIGS. 5 and 6, the area corresponding to the defect signal (DETECT) from the time spot T5 to T6 is determined as a typical defect area. Therefore, the long typical defect can be detected by using the second threshold value (DFTH_N) as a reference level. Similarly, the defect-detecting circuit can be used to detect the long bright defect by using the first threshold value (DFTH_P) as a reference level.

The defect-detecting circuit shown in FIG. 5 is usually implemented by an analog circuit. Since the analog circuit occupies much layout space of the integrated chip and fails to withstand process deviation, the application of this defect-detecting circuit is restrained. Moreover, it is difficult to precisely control the timing of the defect signal changing from the first level to the second level. That is, it is not flexible to adjust the time spots T5 and T6.

For solving the above-mentioned drawbacks, digitalized defect-detecting circuit and method are disclosed in description of US publication No. 20040145987, and the contents thereof are hereby incorporated by reference. As shown in FIG. 7, the defect-detecting circuit disclosed in US publication No. 20040145987 includes an A/D converter 200, a maximum value detector 202, a minimum value detector 204, a first comparator 206, a second comparator 208 and an OR gate 209. A first threshold value TH1 and a second threshold value TH2 are received by the first comparator 206 and the second comparator 208, respectively.

In the digitalized defect-detecting circuit, a radio frequency (RF) signal is converted by the A/D converter 200 into a digital format. The maximum value detector 202 detects an upper value of the digital RF signal, while the minimum value detector 204 detects a bottom value of the digital RF signal. The first comparator 206 compares the upper value of the digital RF with the first threshold value TH1. A logic value "0" is outputted if the upper value of the digital RF signal is larger than the first threshold value TH1, while a logic value "1" is outputted if the upper value of the digital RF signal is smaller than the first threshold TH1. The second comparator 208 compares the bottom value of the digital RF with the second threshold value TH2. A logic value "0" is outputted if the bottom value of the digital RF signal is smaller than the second threshold TH2, while a logic value "1" is outputted if the bottom value of the digital RF signal is larger than the second threshold value TH2. The output ends of the first comparator 206 and the second comparator 208 are coupled to the OR gate 209. According to the comparing results at the first comparator 206 and the second comparator 208, the OR gate 209 outputs a defect signal.

In the digitalized defect-detecting circuit of FIG. 7, asymmetry amount of the RF signal is calculated and used as an index for determining asymmetry degree of the RF signal. Since either the first threshold value TH1 or the second threshold value TH2 is used to determine one kind of defect (the typical defect or the bright defect), it is also difficult to precisely control the timing of the defect signal changing from the first level to the second level.

Therefore, there is a need of providing improved defect-detecting circuit and method so as to obviate the drawbacks encountered from the prior art.

SUMMARY OF THE INVENTION

The present invention provides a defect-detecting circuit for detecting defects on a disc track by using two threshold values (slice signals) to determine the typical defect and the bright defect, thereby precisely controlling the timing of the defect signal.

The present invention provides a defect-detecting circuit having reduced layout space of the integrated chip.

The present invention also relates to a defect-detecting method for detecting defects on a disc track.

In accordance with an aspect of the present invention, there is provided a defect-detecting device for detecting a typical defect area and a bright defect area on a disc track. The defect-detecting device includes a typical defect-detecting circuit and a bright defect-detecting circuit. The typical defect-detecting circuit includes a first peak hold unit, a first subtractor, a second peak hold unit, a second subtractor, a first multiplexer and a first comparator. The first peak hold unit receives a source signal and holds the peak level of the source signal, thereby outputting a first signal at a first drop rate. The first subtractor is electrically connected to the first peak hold unit for subtracting a first threshold value from the first signal, thereby generating a first slice signal. The second peak hold unit receives the source signal and holds the peak level of the source signal, thereby outputting a second signal at a second drop rate. The second subtractor is electrically connected to the second peak hold unit for subtracting a second threshold value from the second signal, thereby generating a second slice signal. The first multiplexer is electrically connected to the first subtractor and the second subtractor, and has a first input end to receive the first slice signal, a second input end to receive the second slice signal, an output end and a select end. The first comparator has a first end receiving the source signal and a second end coupled to the output end of the first multiplexer for comparing the source signal with either the first slice signal or the second slice signal, thereby generating a typical defect signal. The first slice signal and the second slice signal are selectively outputted from the first multiplexer according to the typical defect signal inputted into the select end of the first multiplexer. The bright defect-detecting circuit includes a first bottom hold unit, a first adder, a second bottom hold unit, a second adder, a second multiplexer and a second comparator. The first bottom hold unit receives a source signal and holds the bottom level of the source signal, thereby outputting a third signal at a first rise rate. The first adder is electrically connected to the first bottom hold unit for adding a third threshold value and the third signal, thereby generating a third slice signal. The second bottom hold unit receives a source signal and holds the bottom level of the source signal, thereby outputting a fourth signal at a second rise rate. The second adder is electrically connected to the second bottom hold unit for adding a fourth threshold value and the fourth signal, thereby generating a fourth slice signal. The second multiplexer is electrically connected to the first adder and the second adder, and has a first input end to receive the third slice signal, a second input end to receive the fourth slice signal, an output end and a select end. The second comparator having a first end receiving the source signal and a second end coupled to the output end of the second multiplexer for comparing the source signal with either the third slice signal or the fourth slice signal, thereby generating a bright defect signal. The third slice signal and the fourth slice signal are selectively outputted from the second multiplexer according to the bright defect signal inputted into the select end of the second multiplexer. When a typical defect area is detected by the defect-detecting device, the bright defect-detecting circuit is disenabled but the typical defect-detecting circuit is enabled to detect the typical defect signal. Whereas, when a bright defect area is detected by the defect-detecting device, the typical defect-detecting circuit is disenabled but the bright defect-detecting circuit is enabled to detect the bright defect signal.

BRIEF DESCRIPTION OF THE DRAWINGS

The above contents of the present invention will become more readily apparent to those ordinarily skilled in the art after reviewing the following detailed description and accompanying drawings, in which:

FIG. 1 is a functional block diagram illustrating a conventional servo control system;

FIG. 2 is a timing waveform diagram illustrating a relationship between a sub-beam added signal, a low-pass signal a defect signal;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention.

Figure 3:
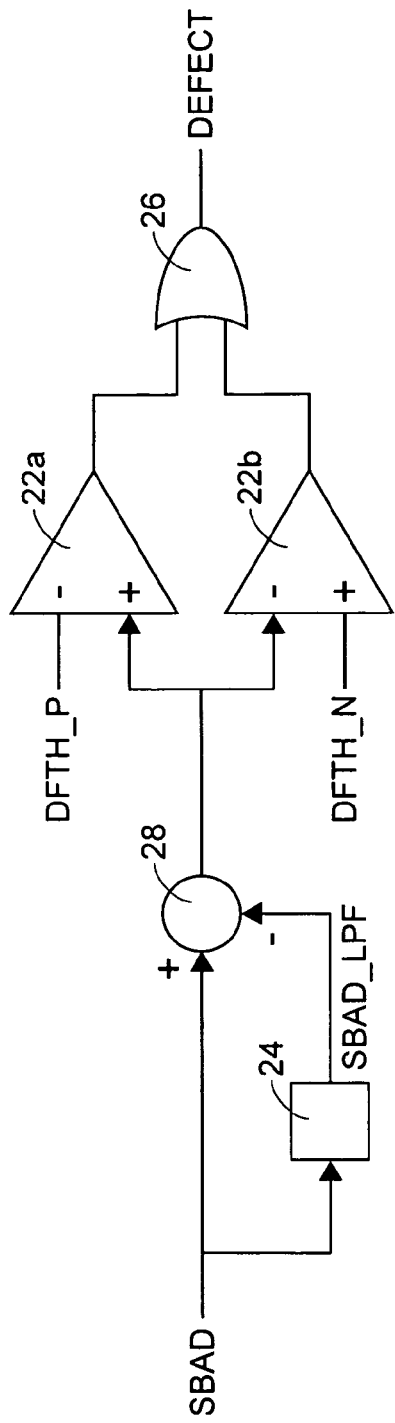
FIG. 3 schematically illustrates a defect-detecting circuit according to prior art.
Figure 4:
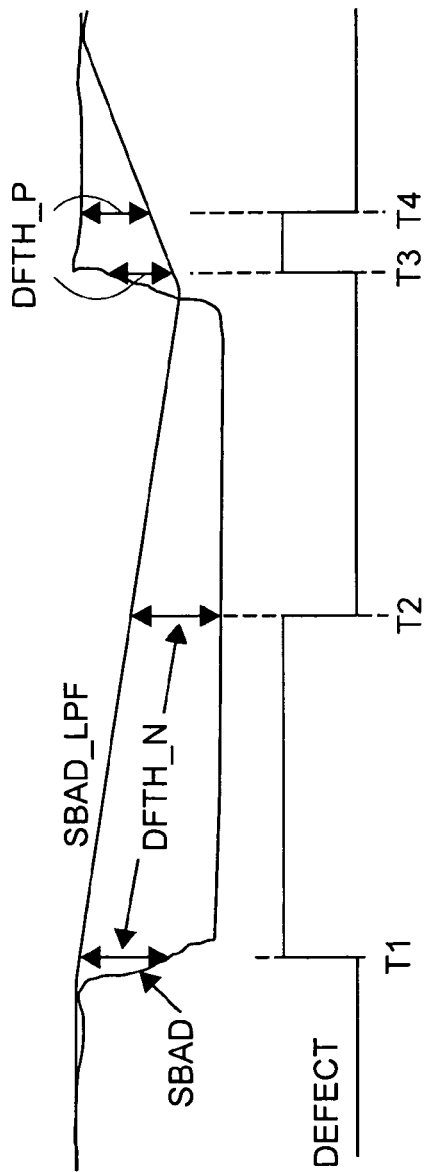
FIG. 4 is a timing waveform diagram illustrating related signals processed in the defect-detecting circuit of FIG. 3, in which a relatively long defect is present.
Figure 5:
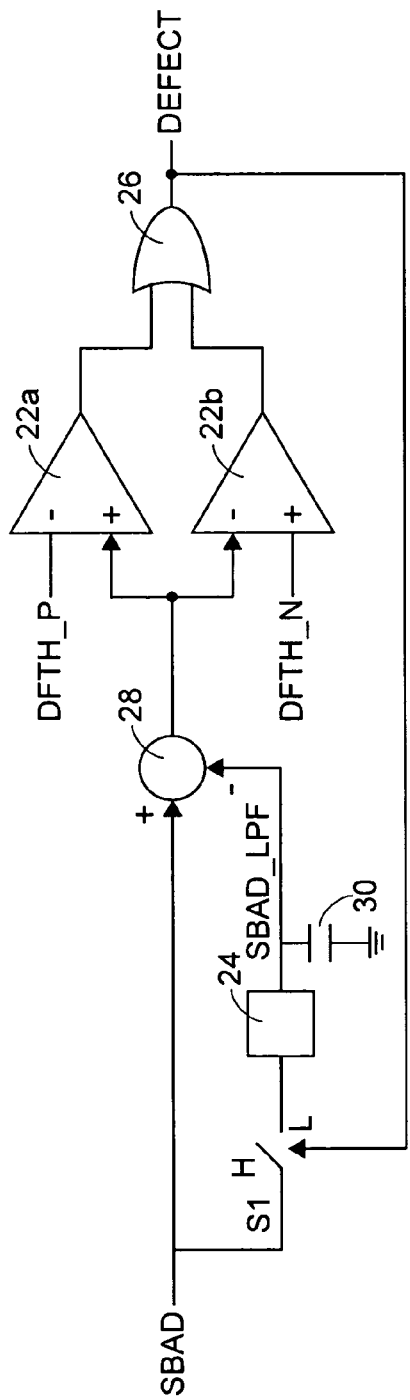
FIG. 5 schematically illustrates another defect-detecting circuit according to prior art a defect-detecting circuit.
Figure 6:
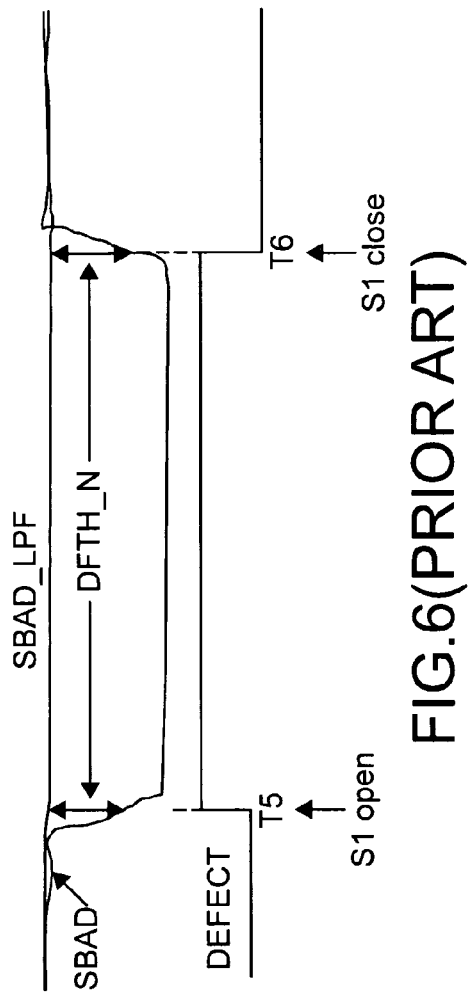
FIG. 6 is a timing waveform diagram illustrating related signals processed in the defect-detecting circuit of FIG. 5, in which a relatively long defect is present.
Figure 7:
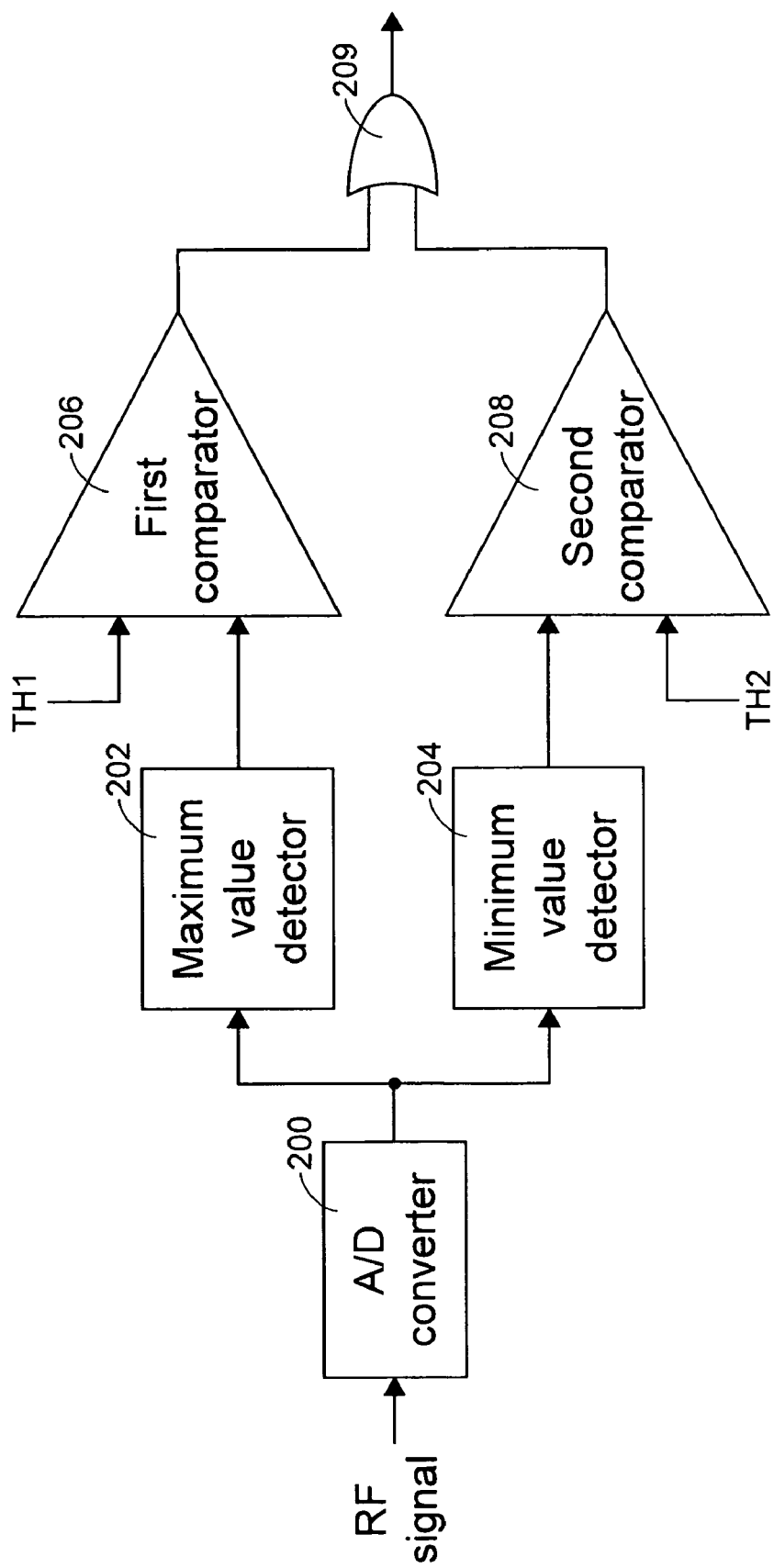
FIG. 7 schematically illustrates a digitalized defect-detecting circuit according to prior art.
Figure 8:
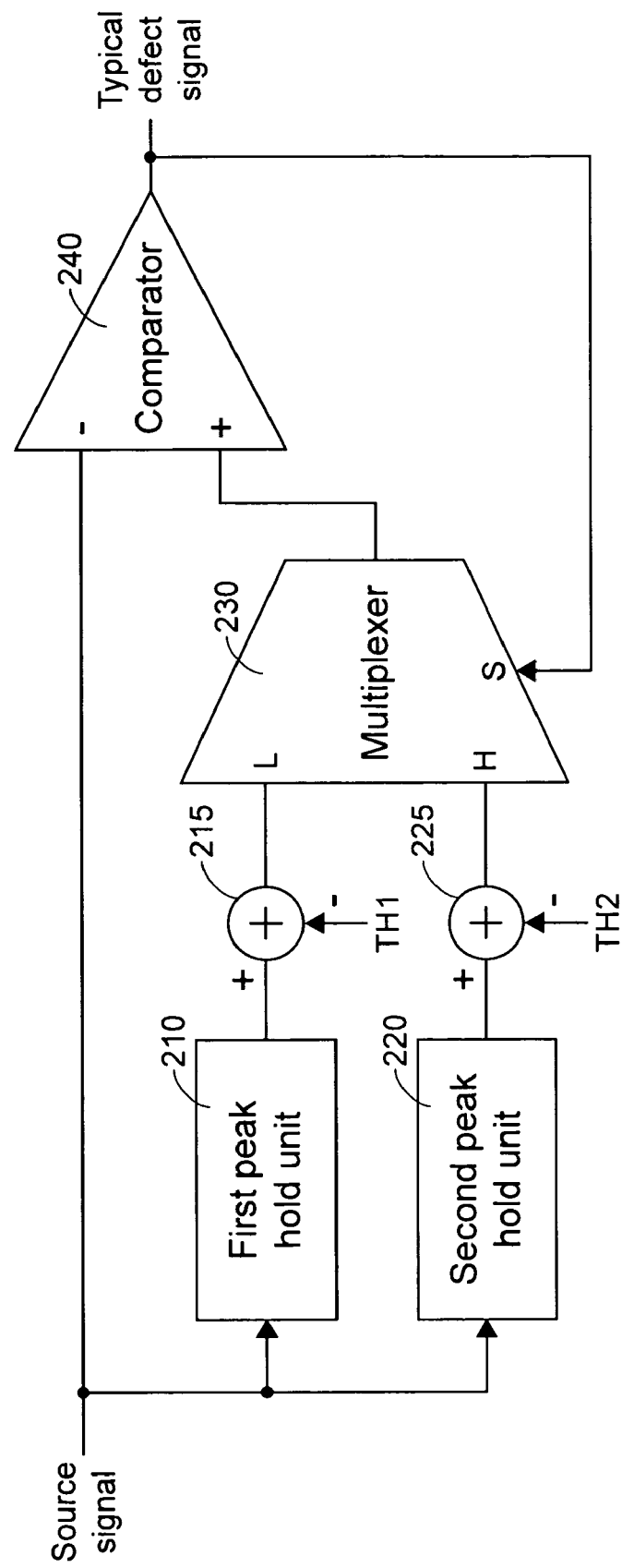
FIG. 8 schematically illustrates a typical defect-detecting circuit for detecting typical defects according to a first preferred embodiment of the present invention.

Referring to FIG. 8, a typical defect-detecting circuit for detecting typical defects according to a first preferred embodiment of the present invention is illustrated. The typical defect-detecting circuit of FIG. 8 principally includes a first peak hold unit 210, a first subtractor 215, a second peak hold unit 220, a second subtractor 225, a multiplexer 230 and a comparator 240. A source signal, e.g. a sub-beam added signal SBAD, a RF envelope signal or a RF top envelope signal, is inputted into a negative input end of the comparator 240, the first peak hold unit 210 and the second peak hold unit 220. A first signal and a second signal are outputted from the first peak hold unit 210 and the second peak hold unit 220, respectively. The first subtractor 215 subtracts a first threshold value TH1 from the first signal and transmits a first slice signal to the low-level input end L of the multiplexer 230. The second subtractor 225 subtracts a second threshold value TH2 from the second signal and then transmits a second slice signal to the high-level input end H of the multiplexer 230. The output end of the multiplexer 230 is coupled to a positive input end of the comparator 240 so as to output a typical defect signal. The typical defect signal is also connected to the select end S of the multiplexer 230.

The first peak hold unit 210 holds the peak level of the source signal, and outputs the first signal at a first drop rate. Similarly, the second peak hold unit 220 holds the peak level of the source signal, and outputs the second signal at a second drop rate. By adjusting the first drop rate and the second drop rate respectively according to the digitalized circuitry design cooperating with threshold values (or slice signals), the typical defect signal would be accurately detected regardless of the length thereof.

Figure 9A:
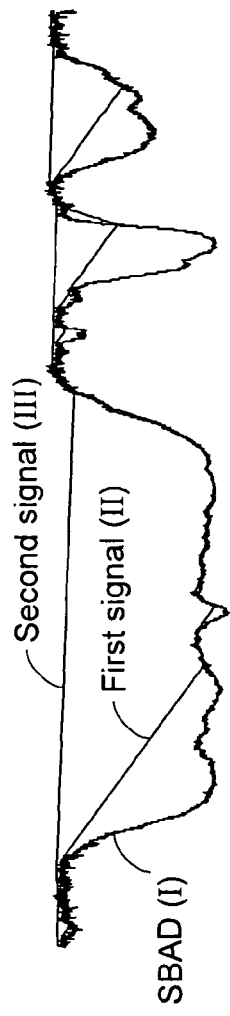
FIGS. 9A, 9B and 9C are timing waveform diagrams illustrating related signals processed in the typical defect-detecting circuit of FIG. 8.
Figure 9B:
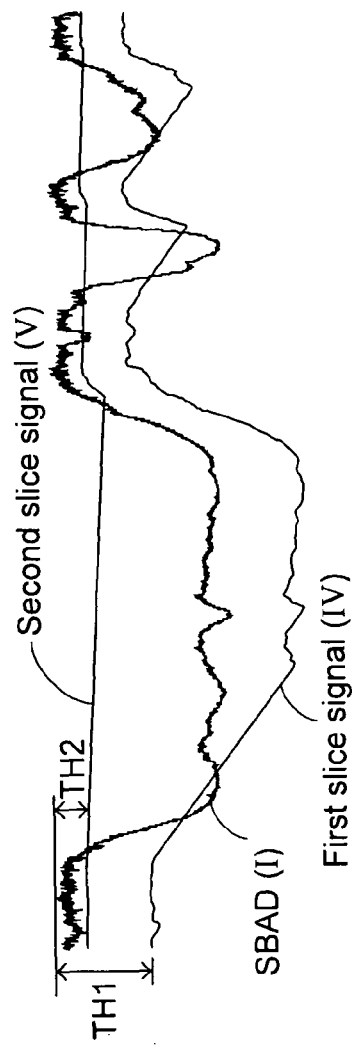
Figure 9C:
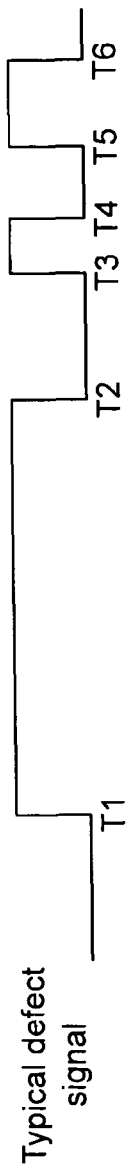

FIGS. 9A, 9B and 9C are timing waveform diagrams illustrating related signals processed in the typical defect-detecting circuit of FIG. 8. As shown in FIG. 9A, the source signal (I) is a sub-beam added signal SBAD. The first signal (I1) is outputted from the first peak hold unit 210 and decreased at a faster drop rate. The second signal (III) is outputted from the second peak hold unit 220 and decreased at a slower drop rate. As shown in FIG. 9B, the first subtractor 215 generates a first slice signal (IV) by subtracting the first threshold value TH1 from the first signal. The second subtractor 225 generates the second slice signal (V) by subtracting the second threshold value TH2 from the second signal. The typical defect signal generated from the typical defect-detecting circuit is shown in FIG. 9C.

As can be seen from FIGS. 9A, 9B and 9C, the sub-beam added signal (I) is gradually decreased when a typical defect area is formed on a disc track. At the same time, the first signal (I1) outputted from the first peak hold unit 210 is decreased at the first drop rate. By subtracting the first threshold value TH1 from the first signal, the first subtractor 215 generates the first slice signal (IV). In addition, the second signal (III) outputted from the second peak hold unit 220 is decreased at the second drop rate. By subtracting the second threshold value TH2 from the second signal, the second subtractor 225 generates the second slice signal (V). Since the typical defect signal inputted into the select end S of the multiplexer 230 is at the low-level state, the multiplexer 230 outputs the first slice signal (IV) to the positive input end of the comparator 240. The sub-beam added signal (I) is also inputted into the negative input end of the comparator 240.

At the time spot T1, since the first slice signal (IV) is larger than the sub-beam added signal (I), the typical defect signal outputted from the comparator 240 is at a high-level state, which indicates the outset of a typical defect area on a disc track. Since the typical defect signal inputted into the select end S of the multiplexer 230 is at the high-level state, the multiplexer 230 outputs the second slice signal (V) to the positive input end of the comparator 240. The sub-beam added signal (I) is also inputted into the negative input end of the comparator 240.

At the time spot T2, since the second slice signal (V) is smaller than the sub-beam added signal (I), the typical defect signal outputted from the comparator 240 is at a low-level state, which indicates conclusion of the typical defect area. Since the typical defect signal inputted into the select end S of the multiplexer 230 is at the low-level state, the multiplexer 230 outputs the first slice signal (IV) to the positive input end of the comparator 240. The sub-beam added signal (I) is also inputted into the negative input end of the comparator 240.

By the typical defect-detecting method and circuit described above, the area corresponding to the defect signal from the time spot T3 to T4 and the area corresponding to the defect signal from the time spot T5 to T6 are determined as typical defect areas. Accordingly, the typical defect areas corresponding to the typical defect signal from T1 to T2, from T3 to T4 and from T5 to T6 are accurately detected regardless of the length thereof.

Figure 10:
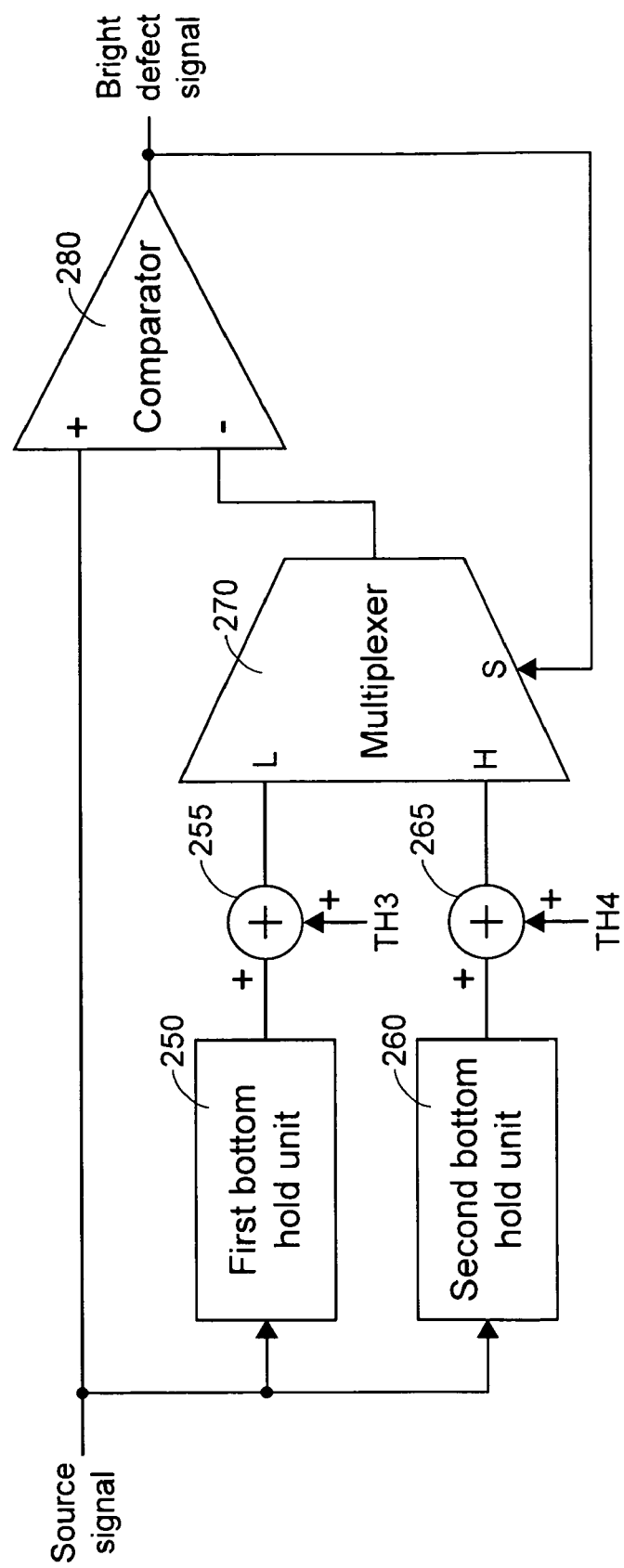
FIG. 10 schematically illustrates a bright defect-detecting circuit for detecting bright defects according to a second preferred embodiment of the present invention.

Referring to FIG. 10, a bright defect-detecting circuit for detecting bright defects according to a second preferred embodiment of the present invention is illustrated. The bright defect-detecting circuit of FIG. 10 principally includes a first bottom hold unit 250, a first adder 255, a second bottom hold unit 260, a second adder 265, a multiplexer 270 and a comparator 280. A source signal, e.g. a sub-beam added signal SBAD, a RF envelope signal or a RF bottom envelope signal, is inputted into a positive input end of the comparator 280 and received by the first bottom hold unit 250 and the second bottom hold unit 260. A third signal and a fourth signal are outputted from the first bottom hold unit 250 and the second bottom hold unit 260, respectively. The first adder 255 adds a third threshold value TH3 and the third signal and transmits a third slice signal to the low-level input end L of the multiplexer 270. The second adder 265 adds a fourth threshold value TH4 and the fourth signal and transmits a fourth slice signal to the high-level input end H of the multiplexer 270. The output end of the multiplexer 270 is coupled to a negative input end of the comparator 280 so as to output a bright defect signal. The bright defect signal is also connected to the select end S of the multiplexer 270.

The first bottom hold unit 250 holds the bottom level of the source signal, and outputs the third signal at a first rise rate. Similarly, the second bottom hold unit 260 holds the bottom level of the source signal, and outputs the second signal at a second rise rate. By adjusting the first rise rate and the second rise rate according to the digitalized circuitry design and cooperating with two threshold values (or slice signals), the bright defect signal would be accurately detected regardless of the length thereof.

Figure 11A:
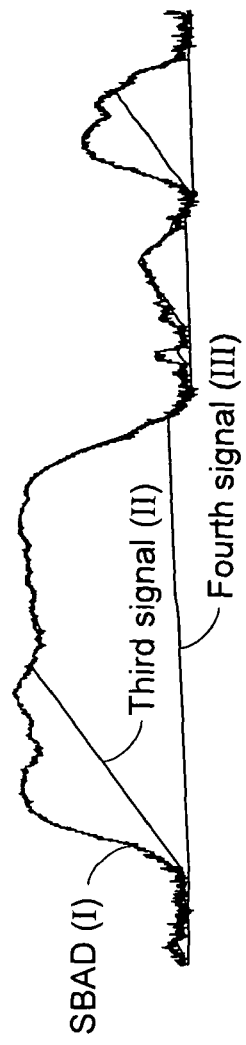
FIGS. 11A, 11B and 11C are timing waveform diagrams illustrating related signals processed in the bright defect-detecting circuit of FIG. 10.
Figure 11B:
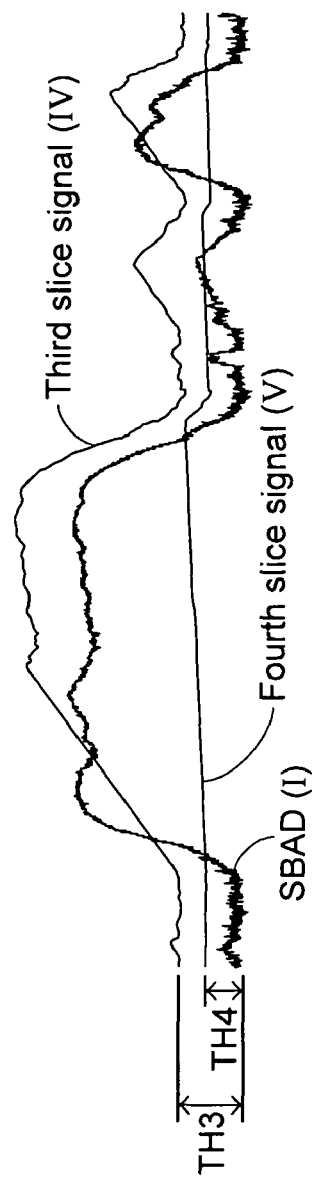
Figure 11C:
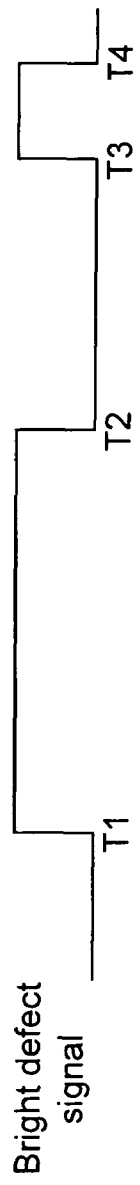

FIGS. 11A, 11B and 11C are timing waveform diagrams illustrating related signals processed in the bright defect-detecting circuit of FIG. 10. As shown in FIG. 11A, the source signal (I) is a sub-beam added signal SBAD. The third signal (III) is outputted from the first bottom hold unit 250 and increased at a faster rise rate. The fourth signal (IV) is outputted from the second bottom hold unit 260 and increased at a slower rise rate. As shown in FIG. 11B, the first adder 255 generates a third slice signal (IV) by adding the third threshold value TH3 and the third signal. The second adder 265 generates the fourth slice signal (V) by adding the fourth threshold value TH4 and the fourth signal. The bright defect signal generated from the bright defect-detecting circuit is shown in FIG. 11C.

As can be seen from FIGS. 11A, 11B and 11C, the sub-beam added signal (I) is gradually increased when a bright defect area is formed on a disc track. At the same time, the third signal (I1) is increased at the first rise rate. By adding the third threshold value TH3 and the third signal, the first adder 255 generates the third slice signal (IV). In addition, the fourth signal (III) is increased at the second rise rate. By adding the fourth threshold value TH4 and the fourth signal, the second adder 265 generates the fourth slice signal (V). Since the bright defect signal inputted into the select end S of the multiplexer 270 is at the low-level state, the multiplexer 270 outputs the third slice signal (IV) to the negative input end of the comparator 280. The sub-beam added signal (I) is also inputted into the positive input end of the comparator 280.

At the time spot T1, since the sub-beam added signal (I) is larger than the third slice signal (IV), the bright defect signal outputted from the comparator 280 is at a high-level state, which indicates the outset of a bright defect area on a disc track. Since the defect signal inputted into the select end S of the multiplexer 270 is at the high-level state, the multiplexer 270 outputs the fourth slice signal (V) to the negative input end of the comparator 280. The sub-beam added signal (I) is also inputted into the positive input end of the comparator 280.

At the time spot T2, since the sub-beam added signal (I) is smaller than the fourth slice signal (V), the bright defect signal outputted from the comparator 280 is at a low-level state, which indicates conclusion of the typical defect area. Since the bright defect signal inputted into the select end S of the multiplexer 270 is at the low-level state, the multiplexer 270 outputs the third slice signal (IV) to the negative input end of the comparator 240. The sub-beam added signal (I) is also inputted into the positive input end of the comparator 240.

By the bright defect-detecting method and circuit described above, the area corresponding to the defect signal from the time spot T3 to T4 is also determined as a bright defect area. Accordingly, the bright defect areas corresponding to the bright defect signal from T1 to T2 and from T3 to T4 are accurately detected regardless of the length thereof.

Moreover, the functions of the typical defect-detecting circuit and the bright defect-detecting circuit are combined into the defect-detecting device of the present invention. In a case that a typical defect area is detected by the defect-detecting device, the typical defect-detecting circuit needs to be enabled to detect the typical defect signal but the bright defect-detecting circuit needs to be disenabled in order to prevent from erroneously generating the bright defect signal. Until conclusion of detecting the typical defect area, the bright defect-detecting circuit is enabled. On the contrary, in a case that a bright defect area is detected by the defect-detecting device, the bright defect-detecting circuit needs to be enabled to detect the bright defect signal but the typical defect-detecting circuit needs to be disenabled in order to prevent from erroneously generating the typical defect signal. Until conclusion of detecting the typical defect area, the typical defect-detecting circuit is enabled.

The typical defect-detecting circuit and the bright defect-detecting circuit of the present invention can be implemented by digitalized circuitry. For example, the sub-beam added signal SBAD is used as the source signal after converted into a digital format by an A/D converter. The first peak hold unit 210, the first subtractor 215, the second peak hold unit 220, the second subtractor 225, the multiplexer 230 and the comparator 240 included in the typical defect-detecting circuit can be implemented by digitalized circuitry. Likewise, the first bottom hold unit 250, the first adder 255, the second bottom hold unit 260, the second adder 265, the multiplexer 270 and the comparator 280 can also be implemented by digitalized circuitry. As a consequence, the defect-detecting device of the present invention has reduced layout space of the integrated chip and is more cost-effective when compared with the prior art.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A defect-detecting circuit for detecting a defect area on a disc track, the defect-detecting circuit comprising:
    a first peak hold unit, for receiving a source signal and holding the peak level of the source signal, thereby outputting a first signal at a first drop rate;
    a first subtractor, for subtracting a first threshold value from the first signal, thereby generating a first slice signal;
    a second peak hold unit, for receiving the source signal and holding the peak level of the source signal, thereby outputting a second signal at a second drop rate;
    a second subtractor, for subtracting a second threshold value from the second signal, thereby generating a second slice signal;
    a multiplexer electrically connected to the first subtractor and the second subtractor, and having a first input end to receive the first slice signal, a second input end to receive the second slice signal, an output end and a select end; and
    a comparator, having a first end receiving the source signal and a second end coupled to the output end of the multiplexer, for comparing the source signal with either the first slice signal or the second slice signal, thereby generating a defect signal, wherein the first slice signal and the second slice signal are selectively outputted from the multiplexer according to the defect signal inputted into the select end of the multiplexer.

2. The defect-detecting circuit according to claim 1 wherein the source signal includes a sub-beam added signal, a RF envelope signal or a RF top envelope signal.

3. The defect-detecting circuit according to claim 1 wherein the first drop rate is faster than the second drop rate.

4. The defect-detecting circuit according to claim 3 wherein an outset of the defect area is determined according to the source signal and the first slice signal.

5. The defect-detecting circuit according to claim 3 wherein a conclusion of the defect area is determined according to the source signal and the second slice signal.

6. The defect-detecting circuit according to claim 1 wherein the defect signal is changed from a first level to a second level when the first slice signal is larger than the source signal, and the defect signal is changed from the second level to the first level when the second slice signal is smaller than the source signal.

7. The defect-detecting circuit according to claim 6 wherein the defect signal changing from the first level to the second level indicates an outset of the defect area, and the defect signal changing from the second level to the first level indicates a conclusion of the defect area.

8. A method for detecting a defect area on a disc track, comprising steps of:
    providing a source signal;
    generating a first signal according to the source signal, wherein the first signal is held at a peak level of the source signal and decreased at a first drop rate;
    generating a second signal according to the source signal, wherein the second signal is held at the peak level of the source signal and decreased at a second drop rate;
    subtracting a first threshold value from the first signal to generate a first slice signal;
    subtracting a second threshold value from the second signal to generate a second slice signal; and
    comparing the source signal with either the first slice signal or the second slice signal, wherein a defect signal is changed from a first level to a second level when the first slice signal is larger than the source signal, and the defect signal is changed from the second level to the first level when the second slice signal is smaller than the source signal.

9. The method according to claim 8 wherein the source signal includes a sub-beam added signal, a RF envelope signal or a RF top envelope signal.

10. The method according to claim 8 wherein the defect signal changing from the first level to the second level indicates an outset of the defect area, and the defect signal changing from the second level to the first level indicates a conclusion of the defect area.

* * * * *